United States Patent [19]

Balling et al.

[11] Patent Number: 5,671,459
[45] Date of Patent: Sep. 23, 1997

[54] CAMERA COVER GUIDE MECHANISM

[75] Inventors: Edward Norman Balling, Rochester; David Clinton Smart, Fairport, both of N.Y.

[73] Assignee: Eastman Kodak Company, Rochester, N.Y.

[21] Appl. No.: 608,371

[22] Filed: Feb. 28, 1996

[51] Int. Cl.$^6$ .................................................. G03B 17/02
[52] U.S. Cl. ............................................................. 396/535
[58] Field of Search ........................... 354/288; 396/535, 396/536, 540, 541

[56] References Cited

U.S. PATENT DOCUMENTS

| | | | |
|---|---|---|---|
| 2,495,223 | 1/1950 | Bodlander | 95/11 |
| 3,256,793 | 6/1966 | Denk et al. | 95/11 |
| 3,599,553 | 8/1971 | Hansen | 95/86 |
| 3,864,705 | 2/1975 | Winkler | 354/187 |
| 3,938,170 | 2/1976 | Winkler et al. | 354/288 |
| 4,012,754 | 3/1977 | Waaske | 354/212 |
| 4,032,940 | 6/1977 | Chan | 354/219 |
| 4,556,304 | 12/1985 | Fukuda | 354/288 |
| 4,589,747 | 5/1986 | Nakayama et al. | 354/149.11 |
| 4,601,562 | 7/1986 | Yoneyama et al. | 354/170 |
| 4,890,130 | 12/1989 | Takei et al. | 354/288 |
| 5,107,287 | 4/1992 | Swayze | 354/82 |
| 5,126,775 | 6/1992 | Nakai et al. | 354/288 |
| 5,255,041 | 10/1993 | Lyon et al. | 354/288 |
| 5,305,039 | 4/1994 | Dassero | 354/288 |
| 5,313,240 | 5/1994 | Lyon et al. | 364/288 |
| 5,400,098 | 3/1995 | Rydelek | 354/288 |

*Primary Examiner*—Safet Metjahic
*Assistant Examiner*—John Chizmar
*Attorney, Agent, or Firm*—Peter J. Bilinski; Robert Luke Walker

[57] ABSTRACT

A translatable cover coupled to a lighttight camera body is movable between a cantilevered open position and a closed position relative to the body. Guide pins provided on different surfaces of the upper part of the cover interior engage longitudinal slots on the exterior of the camera body to allow a smooth sliding motion of the cover. Preferably, the guide pins include shoulders having a greater diameter than the remainder of the pin to minimize torquing of the cover when translated in combination with a lower cover portion which extends from an open end and engages the lower portion of the body to also minimize cantilevering of the cover. In another preferred embodiment, a guide arm extending from the free end can engage a sleeve of the body to minimize cantilevering and torquing while allowing a smooth travel of the cover with fairly loose tolerances.

22 Claims, 8 Drawing Sheets

CAMERA COVER GUIDE MECHANISM

CROSS-REFERENCE TO RELATED APPLICATION(S)

Reference is made to commonly assigned copending application Serial No. U.S. patent application, Ser. No. 08/577,285, entitled: PUMP CAMERA, filed in the names of Dennis R. Zander, David C. Smart, Thomas Dussinger, and Edward N. Balling, which is assigned to the assignee of this application.

FIELD OF THE INVENTION

The invention relates generally to the field of photography, and in particular to still photographic cameras. More specifically, the invention relates to preferred guide mechanisms for an actuatable cover, preferably one which is used in a pump-action type camera.

BACKGROUND OF THE INVENTION

Cameras are known in which a translatable cover is coupled to the lighttight main body of a camera. The translatable cover, movable between an opened or retracted position and a closed position relative to the body portion, engages the film advancing mechanism of the camera when the cover is moved to advance and meter a contained filmstrip in a frame by frame manner, preferably in a single actuation, as opposed to the conventionally known thumbwheel, requiring several rotations to similarly advance the contained filmstrip. Such a camera is described in copending U.S. patent application Ser. No., 08/577,285.

Typically, the translatable pump cover is cantilevered relative to the camera body when moved to the opened position. In cameras of the prior art, such as described by U.S. Pat. No. 4,032,940, the components, including the camera body and the cover, are made from steel, therefore providing a stable support. More recent camera designs, however, such as those referred to as "single use" or "one-time use" cameras manufactured by the Eastman Kodak Company and Fuji Photo Film Co., Ltd., utilize plastic injection molded parts having decreased weight, but also decreased stiffness.

Further, the emphasis in camera design, such as the above referred to "single use cameras" is towards compactness; therefore, it is not only advantageous to provide a stable and efficient support and guiding mechanism for the pump cover, but also desired to provide such a mechanism which does not require excess size and weight constraints.

Because the pump cover is cantilevered to a position which is beyond the actual camera body, and is supported at one end only, the guide system employed must control several different motions. These include a lateral sliding motion as the cover is moved between the open and closed positions, a torquing motion about the center of the camera between the front and the back of the camera, and a cantilever motion of rotation about the center of the camera between the top and the bottom of the camera. Finally, the guide mechanism controls the force imparted to the camera to operate the film advance mechanism and wind the filmstrip across the film plane; that is, an inefficient guide mechanism may require more force to translate the cover, producing possible dissatisfaction.

Therefore, there is a need to provide a smooth guide mechanism for a cover which delivers the required force to wind the filmstrip, while simultaneously providing adequate rigidity.

SUMMARY OF THE INVENTION

The present invention is directed to overcoming one or more of the problems set forth above. Briefly summarized, according to one aspect of the present invention, there is provided a camera comprising:

a lighttight body portion;

a cover having an interior recess for fitting over said body portion and movable in opposite directions between a cantilevered open position and a closed position relative to said body portion; and means for coupling said cover to said body portion, characterized in that:

said coupling means includes means for supporting said cover when said cover is in the cantilevered open position and means for guiding said cover between the opened and closed positions.

According to another aspect of the present invention, there is provided a camera comprising:

a lighttight body portion;

a cover having an interior recess sized for fitting over an end section of said lighttight body portion and an open end, said cover being movable in opposite directions between an opened position and a closed position when said cover is fitted over said body portion; and means for guiding said cover between the opened and the closed positions, characterized by:

an extending portion of said cover extension extending from said open end for additionally supporting said main body portion.

According to yet another aspect of the present invention, there is provided a camera comprising:

a lighttight body portion; and a cover which includes an interior recess sized for fitting over an end portion of the body portion and is movable between a cantilevered open position and a closed position relative to the body portion, characterized in that:

said cover includes a guide arm extending from said open end for engaging a sleeve sized for allowing said guide arm to pass therethrough for coupling said cover to said body portion and for supporting said cover when said cover is moved to the cantilevered open position;

said cover including at least one guide pin extending from the interior of said cover for engaging a slot of said main body portion, said at least one guide pin having a shoulder having a diameter greater than the diameter of the remainder of the pin for fitting within said slot to prevent torquing of said cover between the front and the rear of the camera when said cover is moved between the cantilevered open and the closed position, said slot being configured for retaining the diameter of said pin and the diameter of said shoulder.

An advantage realized by the present invention is that an effective mechanism for guiding an actuatable cover, particularly a cover for a pump camera, is provided which allows smooth, stable and controlled movement to engage the film advance mechanism of the camera.

Another advantage realized by the present invention is that the guide mechanism herein described provides smooth and easy movement while also providing rigidity, required when the cover is extended in the open position.

Yet another advantage realized is that the guide mechanisms described include fitted components, the cover and body, which do not require tight tolerancing, thereby reducing the manufacturing reject rate, while also improving assembly from a cost and time standpoint.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

FIRST EMBODIMENT

Figure 1:
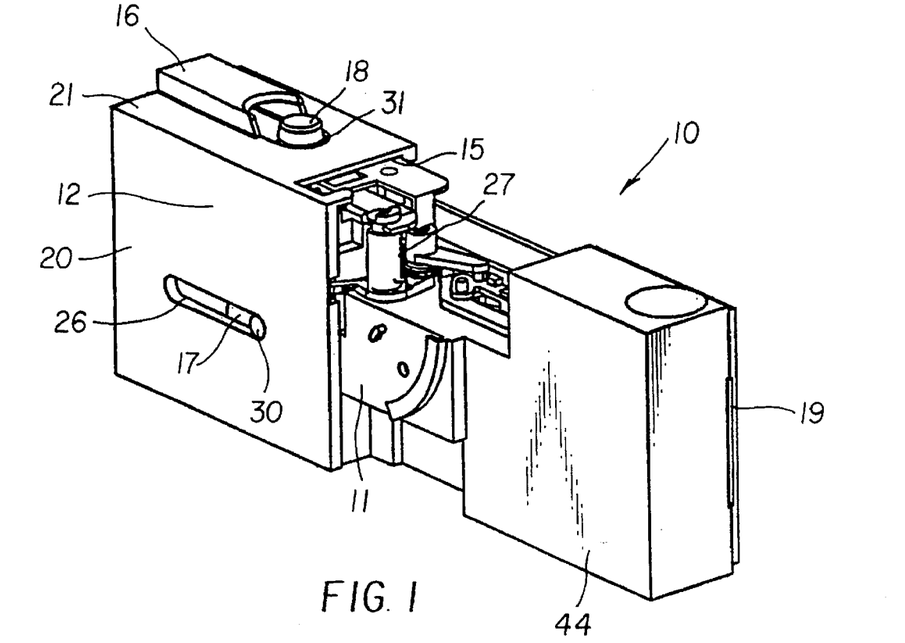
FIG. 1 is a front perspective view of a camera according to a first embodiment of the present invention.
Figure 2:
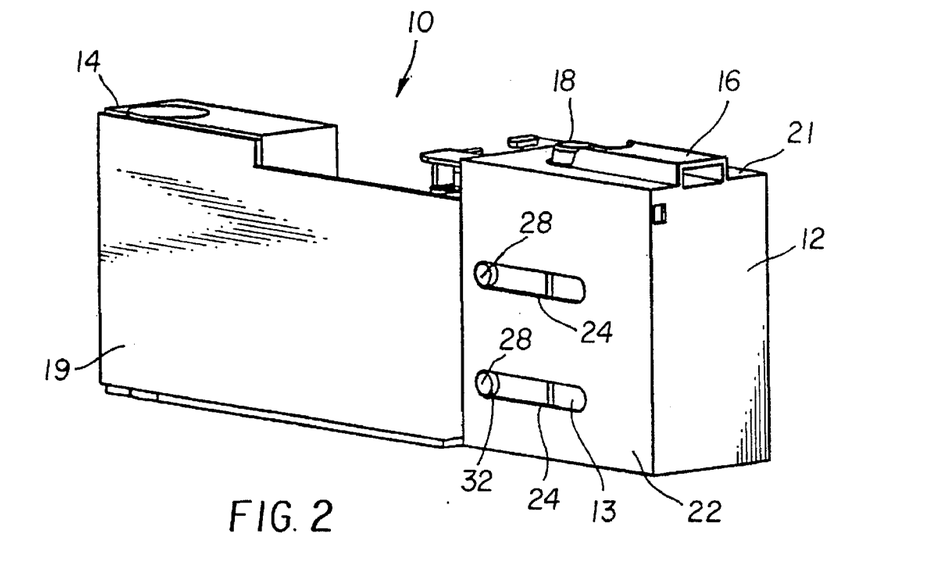
FIG. 2 is a rear perspective view of the camera according to FIG. 1.

Beginning with FIGS. 1 and 2, there is shown a pump cover 12 which is coupled to a main body portion or body 14 of a camera 10 according to a first embodiment of the present invention.

The pump cover 12 is preferably a plastic injection-molded part which fits over one end of the main body portion 14 and is translatably movable between an opened position, as shown in FIGS. 1 and 2, and a closed position (not shown). The pump cover 12 includes an interior recess 13 sized for fitting the entire end portion of the main body portion 14, as well as an open end 15. The camera body portion 14 includes a camera frame 11 sandwiched between a front and rear cover 17, 19, which are assembled together by known means. The covers 17, 19 are only partially shown in FIGS. 1, 2. The camera frame 11 supports a number of photographic components, including a film advance mechanism 27 which interacts with the movable pump cover 14.

Still referring to FIGS. 1 and 2, a pair of spaced parallel longitudinal slots 24 are defined in a rear surface 22 of the pump cover 12, and a single longitudinal slot 26 is defined in a front surface 20 for accommodating guide pins 28, 30, correspondingly located on the rear and front covers 17, 19 of the main body portion 14. The rear slot 26 is parallel to the pair of rear slots 24.

Preferably, each of the guide pins 28, 30 are coplanar with respect to each other, with the single front guide pin 30 being located midway between the spacing of the rear guide pins 28. In this embodiment, the guide pins 28, 30 have a rounded circular cross-section having a diameter which provides a fairly close tolerance fit with the width of the slots 24, 26 to retain the pump cover 12 in a coupled relationship with the main body portion 14.

As noted above, the camera frame 11 supports a number of photographic components, such as the film advance mechanism 27, which includes a depressible shutter release button 18. A more detailed description of the function and interaction of the pump cover 12 with the film advance mechanism 27 is described in copending U.S. patent application Ser. No. 08/577,285, which is hereby incorporated by reference. The camera frame 11 also supports a number of other known photographic components, such as a taking lens, a viewfinder, and an electronic flash assembly, among others, the workings of which are commonly well known in the field, and which require no further discussion as to the present invention.

Referring to FIGS. 1 and 2, the pump cover 12 includes a top surface 21 having a protruding section 16 for covering the depressible shutter release button 18 of the camera main body portion 14 when the cover is moved between the opened and closed positions. When moved to the opened position, however, an end opening 31 in the top surface 21 allows the shutter release button 18 to be accessed.

In operation, the opening and closing positions of the pump cover 12 are dictated by the length and relative positions of the three slots 24, 26. The slots 24, 26 according to this embodiment are of the same length to align with the coplanar guide pins 28, 30, though it should be apparent that this is not required. Alternately, stop surfaces (not shown) can be provided on either the main body portion 14 or pump cover 12 to define other opened and/or closed positions.

In this particular embodiment, the three slots 24, 26 are spaced relative to one another to provide a stable three-point mount for the coupled pump cover 12 throughout its required movement between the opened and closed positions. The sliding motion of the pump cover 12 is solely controlled by the close fitting engagement of the round guide pins 28, 30 within the parallel slots 24, 26, with sufficient clearance to provide an adequate sliding surface. In a preferred version of this embodiment, some of the torquing motion of the pump cover 12 between the front and the back of the camera 10, as the pump cover is translated between the opening and closing positions, can be controlled by providing a shoulder 52, FIG. 3, for at least one of the guide pins 28, 30 for fitting in a T-shaped version of the corresponding slot(s) 24, 26, such as the slots shown as 74 in FIG. 5.

Though a specific three-point arrangement of guide pins has been shown, alternate similar effective configurations are easily imagined. For example, guide pins (not shown) could be located on the interior of the front, top, and rear surfaces of the main body portion 14. In another alternate example, two of the guide pins can be provided on the front surface and a single pin can be provided on the rear surface of the main body section; that is, reversing the described positions of the pins 28, 30. It should also be readily apparent that the guide pins and slots could be disposed on either the main body portion or the pump cover, and that a number of additional guide pins could be utilized, in excess of the three pins of the present embodiment. An alternate embodiment of a guiding mechanism having such an arrangement is now described which does not necessarily require a three-point mount.

SECOND EMBODIMENT

Figure 3:
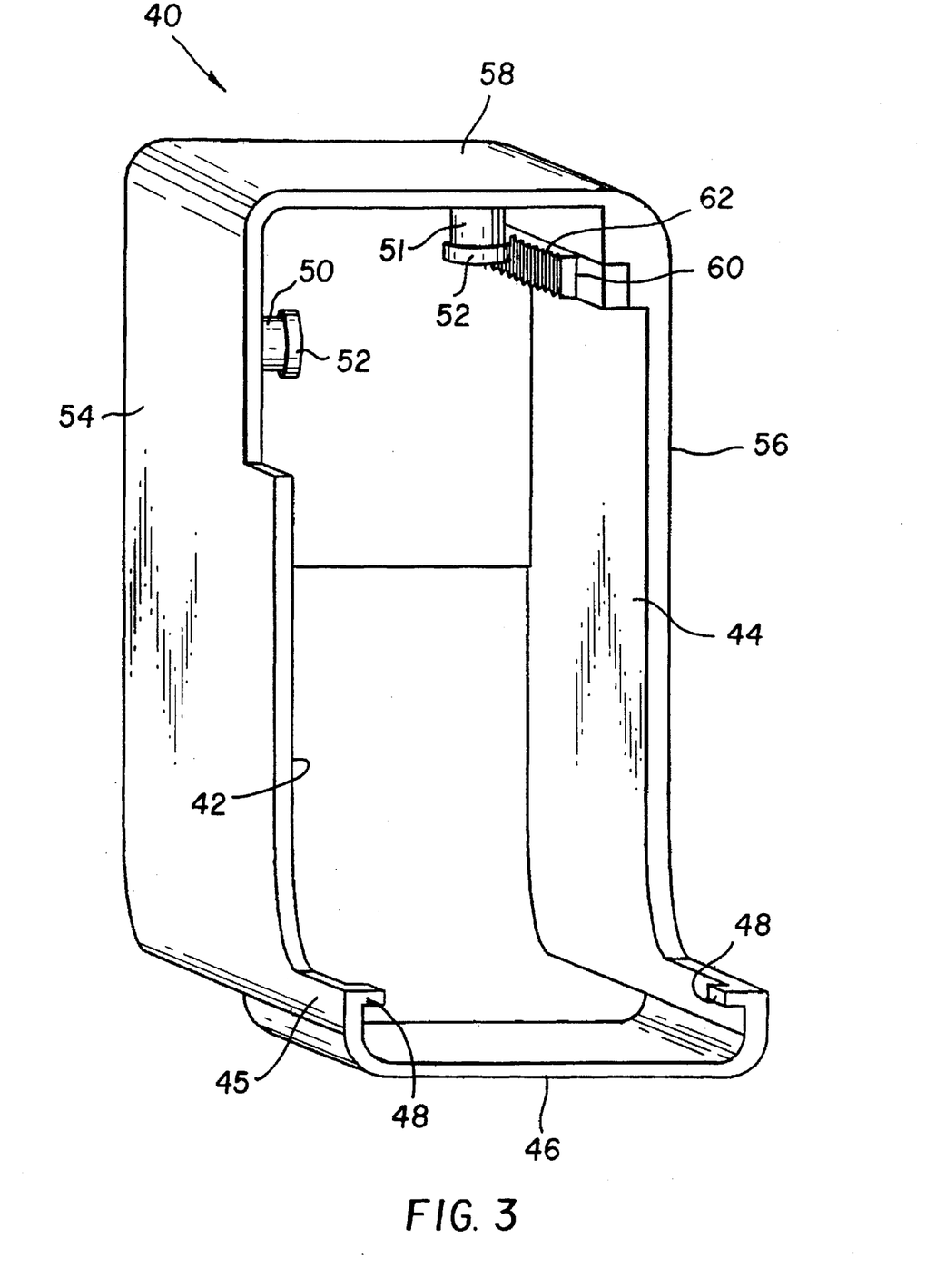
FIG. 3 is a front perspective view of a pump cover according to a second embodiment of the present invention.
Figure 4:
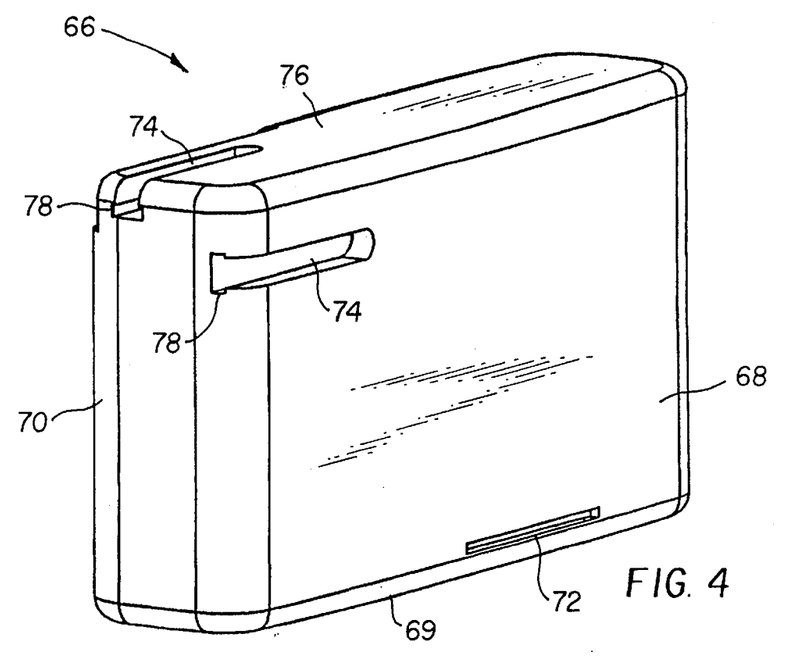
FIG. 4 is a front perspective view of a camera body which is coupled to the pump cover of FIG. 3.
Figure 5:
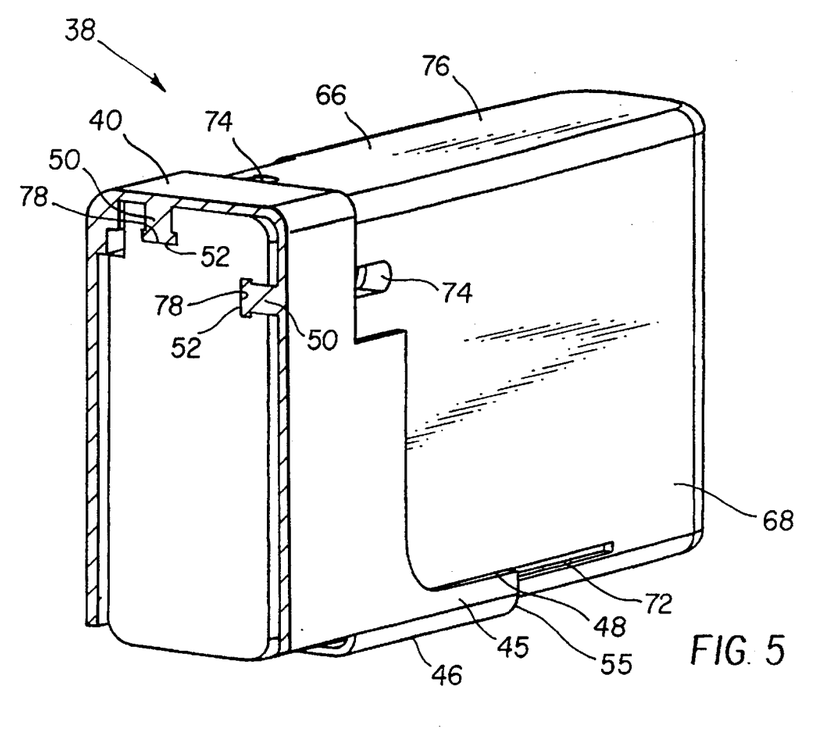
FIG. 5 is the front perspective view of FIG. 4 showing the attachment slots of the main body portion for attachment to the pump cover.

A second embodiment of the present invention is shown in FIGS. 3–7. Referring briefly first to FIG. 5, there is described a camera 38, including a movably translatable pump cover 40 that is coupled to a main body portion or body 66.

Referring now to FIGS. 3 and 4, a more detailed description of the pump cover 40 and the main body portion 66 follows. The pump cover 40, similar to the previously described pump cover 12, FIG. 1, is an injection-molded plastic part having an interior recess 42 defined by five different sides and an open end 44. The pump cover 40 according to this embodiment, however, includes a staggered lower portion or extension 45 that extends curved bottom surface 46 to a greater length from the open end 44 than the remainder of the cover in order to provide a stable support when the assembled camera 38, FIG. 5, is placed in an upright position after the cover has been coupled to the lighttight main body portion 66.

The lower portion 45 includes a pair of guide tabs 48 extending from the interior of respective front and rear surfaces 54, 56 of the pump cover 40, for engagement with a pair of corresponding and longitudinally arranged guide tab slots 72 disposed on the front and rear covers 68, 70 of the main body portion 66 which are adjacently located relative to the bottom surface 69 of the body portion. For reasons detailed below, it is preferred that the guide tabs 48 be placed adjacent the extended end 55 of the lower portion 45.

A pair of guide pins 50, 51 depend from the interior of the front and top surfaces 54, 58, of the pump cover 40, preferably adjacent the open end 44. Each of the guide pins 50 include a rounded shoulder 52 at a depending end having a diameter which is greater than the diameter of the remainder of the guide pin. Guide pin 50 is preferably adjacent the top surface 58 of the pump cover 40 and is coplanar with the guide pin 51.

A gear rack 60 is disposed on the interior of the rear surface 56 of the pump cover 40, having a longitudinally arranged set of spaced gear teeth 62. The gear teeth 62 engage an idler gear (not shown in this embodiment) which correspondingly engages a film drive gear (not shown) of a film advance mechanism (not shown) of the camera 38, FIG. 5, when the cover is moved between the opened and the closed positions as described in the previously incorporated and copending U.S. patent application Ser. No. 08/577,285.

Turning specifically to FIG. 4, the camera main body portion 66, is also similar to that previously described; that is, the body portion is a lighttight assembly made up of a plastic injection-molded front cover 68 and a rear cover 70 which sandwich a camera frame (not shown). The camera frame includes a number of known photographic components, as well as a film advance mechanism (not shown) which interfaces with the coupled pump cover 40, FIG. 5, when the cover is moved between the opened and the closed positions.

A pair of longitudinal slots 74 are provided on the top of the rear cover 70 and the front of the front cover 68, which are sized for retaining the guide pins 50, 51. The slots 74 have a width at least equal to the respective diameters of the guide pins 50, 51, and are defined by an open end 78. The slots 74 each have a T-shaped cross-section to accommodate differing diameters of the guide pins 50, 51 and shoulders 52, wherein the front and rear covers 68, 70 are preferably built up to have a greater thickness in the areas of the slots to accommodate the guide pins and shoulders over the entire length of the slots, see FIGS. 6 and 7. Each of the pairs of slots 72, 74 have equal lengths which preferably define the travel of the coupled cover 40 between the opened and the closed positions.

Figure 6:
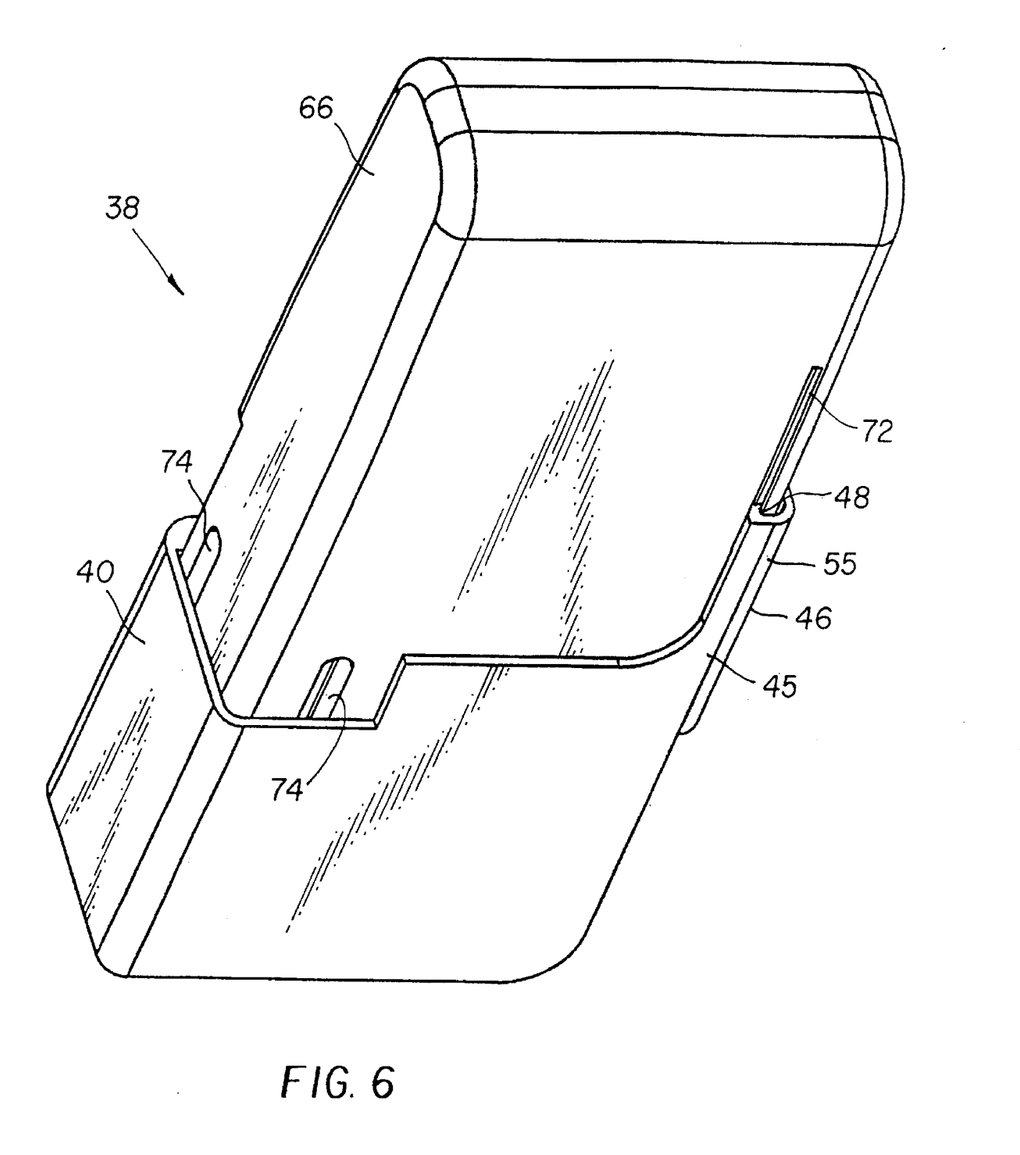
FIG. 6 is a front perspective view of the camera body of FIGS. 4 and 5 with the coupled pump cover of FIG. 3 in the opened position.
Figure 7:
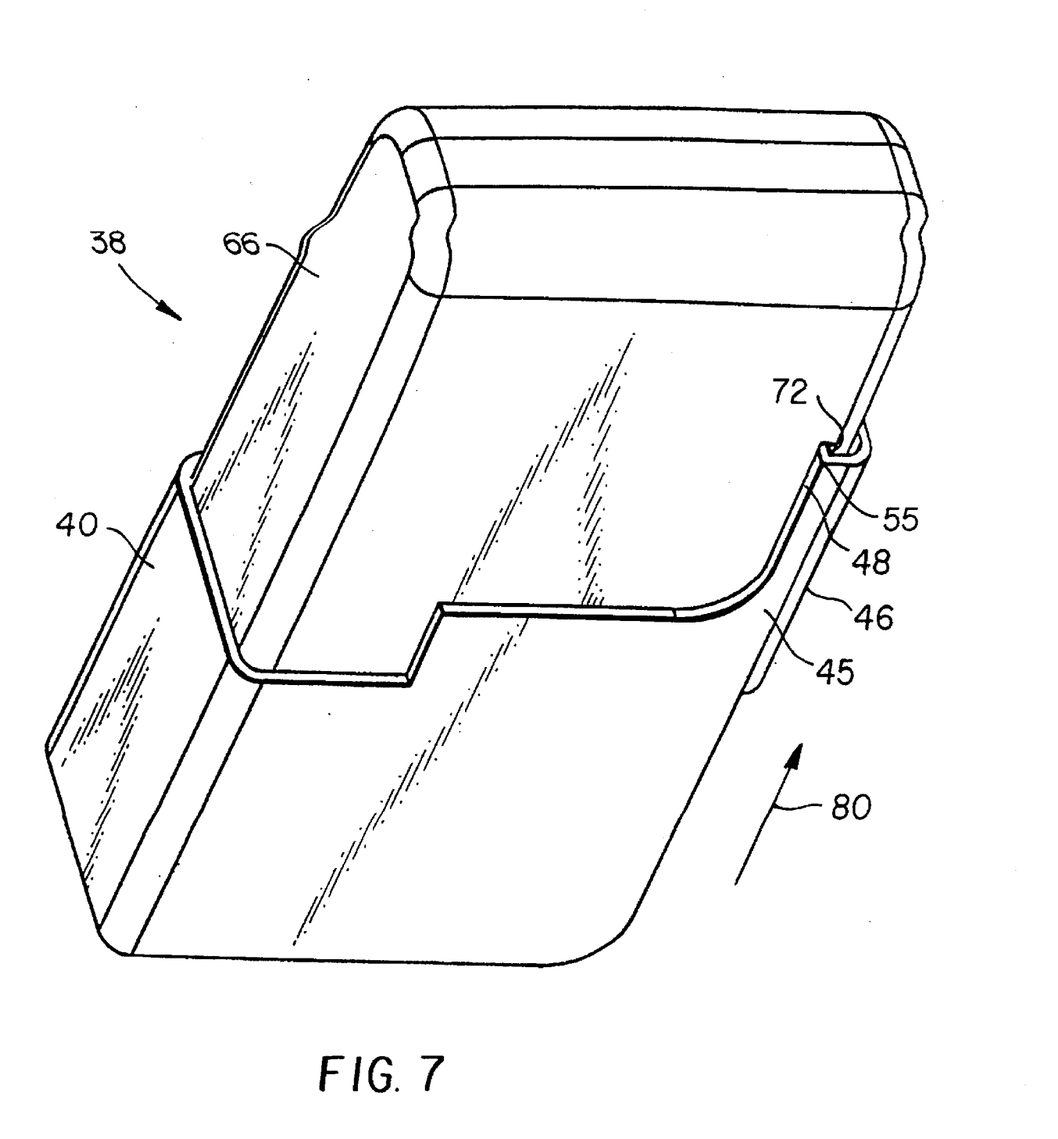
FIG. 7 is the front perspective view of FIG. 6, showing the pump cover in the closed position.

Referring to FIGS. 5–7, the pump cover 40 is shown as coupled to the lighttight body portion 66 in the opened position, FIGS. 5 and 6, and the closed position, FIG. 7, respectively, in which the cover is moved in the direction 80.

In operation, and when the pump cover 40 is coupled to the main body portion 66 of the camera 38, the guide pins 50, 51 of the pump cover 40 are engaged with the longitudinal slots 74 through the T-shaped openings 78 of the lighttight main body portion 66 to form a smooth sliding surface as the cover is moved between the opened and the closed positions to control the sliding motion of the pump cover 40.

In addition, the engagement of the guide tabs 48 of the lower portion 45 of the pump cover 40 with the parallel guide tab slots 72 of the camera body portion 66 also provide a smooth guiding surface for the cover, as well as effectively control the cantilevering motion of the cover 40 between the top and the bottom of the camera as the cover is translated between the opened and closed positions. In this preferred embodiment, the guide tabs 48 are located a maximum distance from the guide pins 50, 51 to create a large base arm for negating the rotational effect about the camera which is created by the guide pins 50, 51 when the cover is in the opened position.

The torquing effect between the front and the rear of the camera is also negated by the fit of the shoulders 52 in the T-shaped slots 74 which is complemented by the fit of the guide tabs in the lower portion of the cover 40. The contoured fit between the sides of the extended lower portion of the cover 40 and the front and rear surfaces of the camera body portion 66 also minimizes the torquing effect.

Figure 3A:
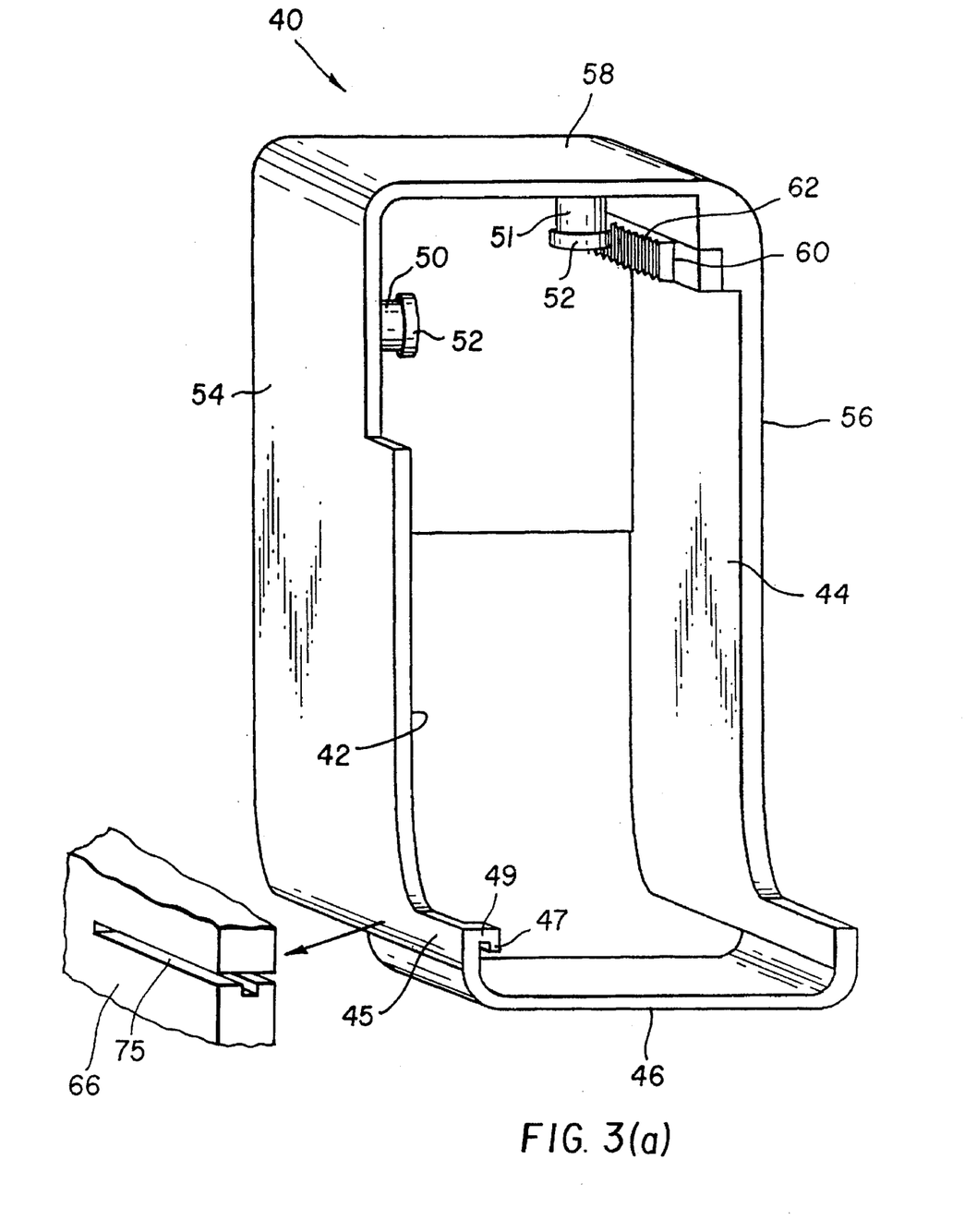
FIG. 3(a) is the front perspective view of another version of the pump cover according to the second embodiment.

A number of variations are possible in the described embodiment. For example, though the preferred version describes a pair of guide tabs 48 in the lower portion 45 of the pump cover 12, one guide tab could be utilized with a modification to be able to control the cantilevering motion of the cover. Referring to FIG. 3(a), a single guide tab 49 is provided on the interior of the front surface 54 of the lower portion 45 of the cover 40 and includes a downward extending portion 47 for engaging a slot 75 of the main body portion, the slot having a similar configuration to retain the downward extending portion 47.

In operation, the cantilevered motion of the pump cover 40 is controlled by the engagement of the downward extending portion 47 with the bottom of the slot 75, or the engagement of the top of the guide tab 49 with the top of the slot and by the engagement of the shoulder 52 with the interior surfaces of the guide slots 74. Note that precise tolerancing is not required for any of the fits described in this embodiment; that is, some play within the slots is acceptable and allows smoothness of motion and fewer manufacturing defects. Rigidity of the cover, however, is maintained.

In another alternate version of this embodiment, a single guide pin 50 can be utilized on the interior of the front surface 54 of the pump cover 40 in lieu of two guide pins, as described if a pair of guide tabs are used on the lower portion of the cover. Preferably, however, it is desirable to use at least two guide pins to control the torquing motion of the cover. Other useful variations can be easily imagined.

THIRD EMBODIMENT

A third embodiment is herein described with reference to FIGS. 8 and 9. A camera 100 includes a camera main body portion 92 and a translatable pump cover 90, which as previously described is coupled to the main body portion or body and is movable in opposing directions between an opened position and a closed position. The pump cover 90 is shown in the opened position in FIGS. 8 and 9.

It should here be noted that throughout this embodiment, terms such as "upward", "downward", "horizontal", and "vertical" are used. These terms are used to provide a frame of reference while the camera 100 is in an upright position as shown in the FIGS. 8 and 9 and are not intended to be limiting to the workings of the present invention.

The main body portion 92, also as previously described, includes a plastic front cover (not shown) and rear cover 84 which sandwich a camera frame 86 in a lighttight manner. For the sake of clarity, the front cover is not shown in this embodiment. A number of photographic components are attached to the exterior of the camera frame 86, particularly shown is a portion of a film advance mechanism 105 which interfaces with the pump cover 90. The film advance mechanism 105 is briefly described below.

The pump cover 90 is similar to that described in the second embodiment having an interior recess 85 sized for fitting over an end 93 of the main body portion 92, as well as having an open end 82. The cover has an extension 145 including a lower portion 95 and guide arm 94. The lower portion 95 provides additional stability when the cover is coupled to the main body portion 92 and the camera 100 is placed in an upright position; that is, a position in which the lower portion is set onto a flat surface, like that shown in FIG. 9. The lower portion 95 is contoured to fit the bottom of the main body portion 92 and therefore also reduces the torquing effect of the cover 90 between the front and the rear of the cover during the translation of the cover.

The beam-like guide arm 94 extends outwardly from the interior of a front surface 91 of the pump cover 90, from the open end 82, for engagement with the main body portion 92, as described below. In this embodiment, the span of the guide arm 94 is adjacent the cover's lower portion 95.

Figure 9:
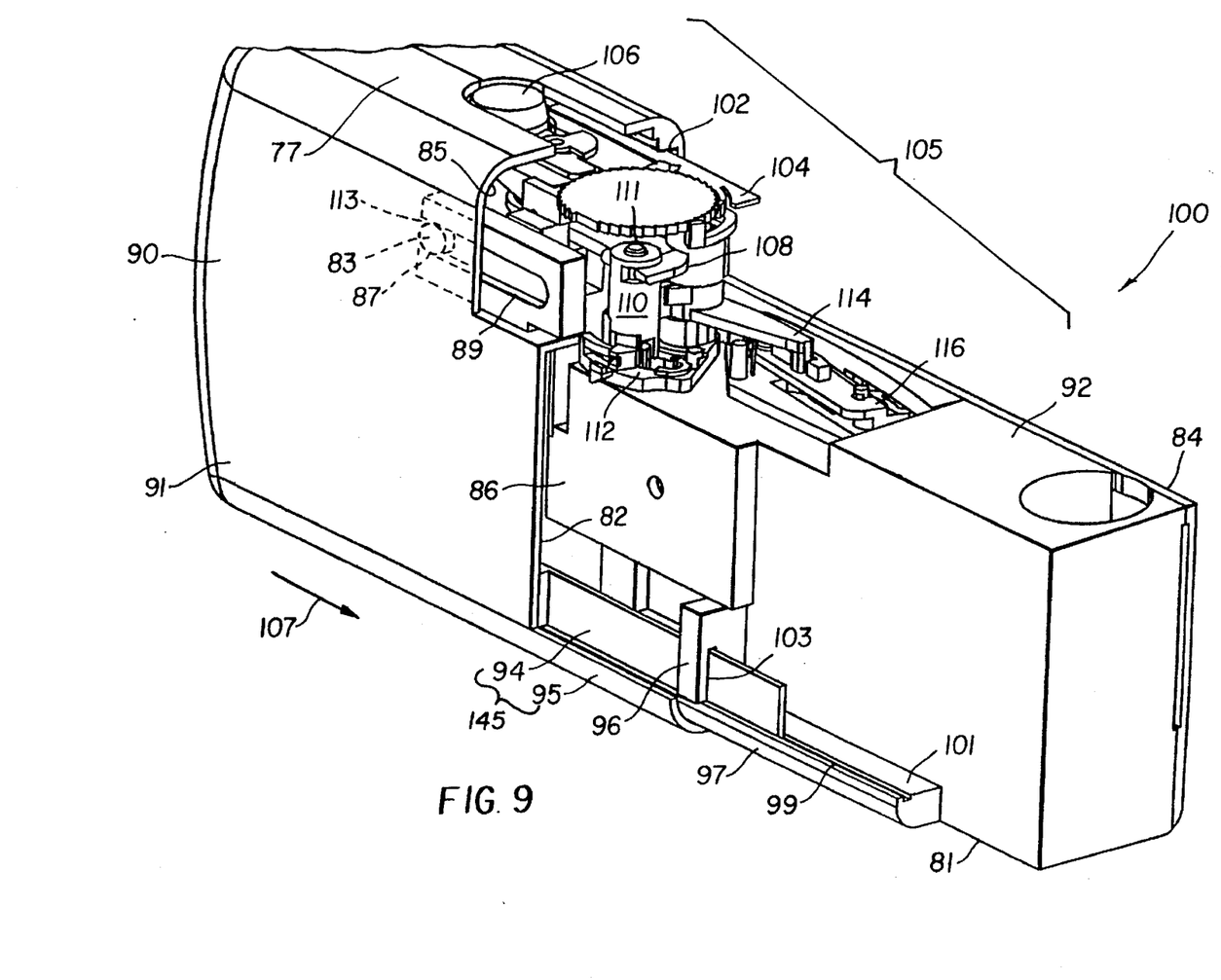
FIG. 9 is the partial front perspective view of FIG. 8 showing the coupled pump cover.

A guide pin 83, similar to those previously described such as 50, 51, FIG. 3, shown in phantom in FIG. 9, depends from the interior of the front surface 91 and includes a rounded shoulder 87. Preferably, the guide pin 83 of this embodiment is positioned adjacent the open end 82 and a top surface 77 of the cover 90 for reasons described below.

The pump cover 90 includes a gear rack 60, FIG. 8, which is disposed within the interior of the rear surface 109 of the pump cover 90, and includes a spaced set of longitudinally arranged gear teeth 62 for engaging an idler gear (not shown) of the film advance mechanism 105, as briefly described below.

Figure 8:
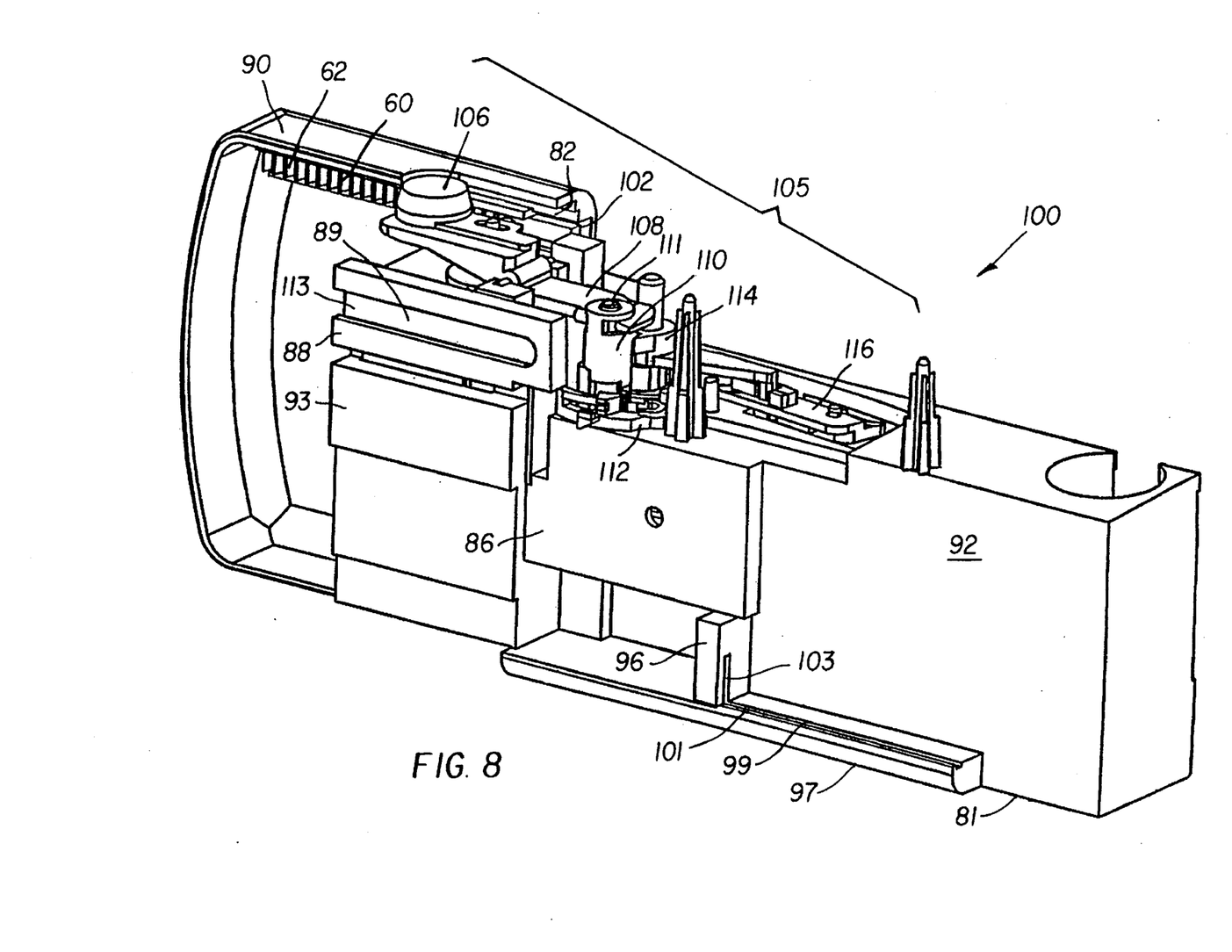
FIG. 8 is a partial front perspective view of a pump camera with the front half cutaway according to a third embodiment.

Referring specifically to FIG. 8, the main body portion 92 of the camera 100 includes a front surface 88 having a cover guide portion 97 as a molded-in feature. The cover guide portion 97 projecting from a front surface 88 and adjacent the bottom surface 81 includes a supporting horizontal surface 101 having an engagement groove 99, the groove having a width sized for fitting the lower edge of the extending guide arm 94 when the pump cover 90 is coupled thereto. The cover guide portion 97 also includes a sleeve 96 extending upwardly from the horizontal supporting surface 101 having a vertical slot 103 sized for fitting the width of the guide arm 94 when the pump cover 90 is coupled to the main body portion 92.

The front surface 88 of the main body portion 92 also includes a slot 89 having an T-shaped open end 113, similar to the slots 74, FIG. 5, described above and having a width sized for containing the shoulder 87 of the guide pin 83.

As noted above, the pump camera 100 includes a film advance mechanism 105 attached to the exterior of the camera frame 86 which is now briefly described.

A depressible shutter release button 106 forms one part of a pivotable trigger 108 which is attached at an opposite end to a metering release element 110. Prior to the depression of the shutter release button 106, a high energy lever 112 is biased by means (not shown) in a cocked position, and is restrained by the metering release element 110. Depression of the shutter release button 106 causes the trigger 108 to pivot and raise the metering release element 110 and also releases the high energy lever 112 due to the movement of the metering release element, allowing the high energy lever to strike a shutter blade (not shown) in an conventional manner.

The pump cover 90 is then moved from the opened position, shown in FIGS. 8 and 9, in the direction 107 toward the closed position causing an engagement feature (not shown) on the cover to engage the high energy lever 112 and metering release element 110, respectively, causing each to pivot. The metering release element 110 is mounted over a post 111 of the camera frame 86 and simply rotates, causing an engagement feature (not shown) of the element to engage a demetering lever 114 which similarly rotates to disengage from a film metering member 116. Simultaneously, the high energy lever 112 is moved back to the cocked position by the closing movement of the pump cover 90.

The unlocking of the film metering member 116 allows a filmstrip (not shown) to be advanced due to the engagement of the interior gear rack 60 of the translating pump cover 90 with an idler gear (not shown) which is in corresponding engagement with a film drive gear (not shown) to rotate a film spool (not shown) of a contained film cartridge (not shown).

A keeper plate 104, shown only in FIG. 9, fastened by known means over the top of a major portion of the film advance mechanism 105, provides a downward maintaining force, particularly to the idler gear and film advance gear (not shown). The rear surface 109 of the cover 90 preferably includes a tab-like surface 102 which is provided to assist in aligning the pump cover 90, particularly the gear rack 60 with the idler gear (not shown). When coupled, the tab surface 102 slides across the top of the keeper plate 104 to provide an even sliding surface which maintains contact with the top of the keeper plate as the cover 90 is translated.

As the pump cover 90 moves toward the closed position, the film metering member 116 is relocked by the demetering lever 114 after a frame of the filmstrip (not shown) has been advanced. The relocking of the demetering lever 114 reverses the pivoting action of the cover 90 and drops the metering release element 110 into a position which blocks the now-cocked high energy lever 112. The trigger 108 is pivoted by the movement of the attached metering release element 110, resetting the shutter release button 106. The pump cover 40 can then be reopened to the opened position with the filmstrip (not shown) properly metered and ready for exposure by depression of the shutter release button which is accessible after the cover is translated back to the opened position. The film advance mechanism 105 and the interaction of the mechanism with the translatable pump cover 90 are more completely described in U.S. patent application Ser. No. 08/577,285, previously incorporated by reference.

When coupled, as shown in FIG. 9, the lower portion 95 having a curved bottom surface retains the bottom of the main body portion 92. The fit between the extending guide arm 94 and the vertical slot 103 of the sleeve 96, as well as the beam strength of the guide arm, supports the pump cover 90 when the cover is in the opened position in which the cover is cantilevered from the main body portion 92 and also controls the cantilevering motion of the pump cover 90; that is, undue motion of the cover between the top and the bottom of the camera, as the cover is translated between the open and closed positions. Preferably, the sleeve 96 and vertical slot 103 are positioned as great a distance as possible from the guide pin 83 in order to provide an effective base or lever length to better control the cantilevering motion of the cover. The base length established also minimizes the effect of tolerancing, so that the fit of the guide pin and the slot and the guide arm and the vertical slot need not be as precise, affording smoother motion while maintaining rigidity. The guide arm 94 has a length which allows the arm to be supported with the slot 103 during the entire range of travel of the cover 90 between the opened and closed positions.

Any torquing motion of the pump cover 90; that is, undue motion between the front and the rear of the camera as the cover is translated between the opened and closed positions, is controlled by the engagement of the single front guide pin 83 of the cover with the front slot 89 of the main body portion 92, as complemented by the fit of the guide arm in the slot 103 as well as the engagement groove 99.

All of the guiding surfaces; that is, the engaged guide pin 83 with the slot 89, the guide arm 84 with the engagement groove 99, and the tab surface 102 with the keeper plate 104 provide suitable sliding surface to allow ease in moving the cover 94 between the opened and the closed positions. In addition, the tab surface 102 aligns the cover with the film advance mechanism 105, thereby creating a simple and efficient guiding mechanism.

It should be particularly noted that all of the camera guide surfaces of this specific embodiment are internal to the camera 100, providing a number of advantages, such as allowing the camera to be stably set in any orientation onto a flat surface.

The invention has been described with reference to several preferred embodiments. However, it will be appreciated that variations and modifications can be effected by a person of ordinary skill in the art without departing from the scope of the invention.

PARTS LIST FOR FIGS. 1-9

10 camera
11 camera frame
12 pump cover
13 interior recess
14 main body portion
15 open end
16 projecting portion
10 17 front cover
18 shutter release button
19 rear cover
20 front surface
21 top surface
15 22 rear surface
24 slots
26 slot
27 film advance mechanism
28 rear guide pins
30 front guide pin
31 top opening
38 camera
40 pump cover
42 interior recess
44 open end
45 lower portion of pump cover
46 bottom surface
47 downward extending portion
48 lower guide tabs
49 guide tab
50 guide pin
51 guide pin
52 shoulder
54 front surface
55 extended end
56 rear surface
58 top surface
60 gear rack
62 gear teeth
66 main body portion
68 front cover
69 bottom surface—camera body
70 rear cover
72 tab slot
74 longitudinal slot
76 top surface—body
77 top surface—cover
78 open end
81 bottom surface
82 open end
83 guide pin
84 rear cover
85 interior recess
86 camera frame
87 shoulder
88 front surface
89 slot
90 pump cover
91 front surface—cover
92 main body portion
93 end
94 extending guide arm
95 lower portion
96 guide arm sleeve
97 guide portion
98 bottom surface
99 guide arm engagement groove
100 camera
101 horizontal supporting surface
102 gear rack tab
103 vertical slot
104 keeper plate
105 film advance mechanism
106 shutter release button
107 arrow
108 trigger
109 rear surface
110 metering release element
111 post
112 high energy lever
113 T-shaped open end
114 demetering lever
116 film metering member

We claim:
1. A camera comprising:
 a lighttight body; and
 a cover having opposed top and bottom surfaces and opposed front and rear surfaces, said cover having an open end and an interior recess sized for fitting over an end of said body, said cover having an extension extending from said bottom surface, said cover being movable relative to said body between a cantilevered open position and a closed position;
 said body and said cover together having a plurality of guide pins and slots retaining said guide pins, each said guide pin being disposed on one of said cover and said body, each said guide pin having a shoulder with a diameter larger than a diameter of a remainder of said guide pin, each said slot having a T-shaped contour closely fitted to said diameters of said shoulder and said remainder of a respective said guide pin and being disposed on the other of said cover and said body, said guide pins and slots being spaced apart from said extension.

2. The camera of claim 1 wherein said top surface of said body and at least one of said front and back surfaces of said body are coupled to said cover by at least one said guide pin and slot.

3. A camera according to claim 1, wherein at least one said guide pin is disposed on an interior surface of said cover and engages a respective said slot of said body to which said cover is coupled.

4. A camera according to claim 1, wherein said guide pins are disposed on the interior of at least two different surfaces of said cover for engaging respective said slots of said body.

5. A camera according to claim 1, wherein said extension includes at least one guide tab and said body has a slot engaging said guide tab.

6. A camera according to claim 1, wherein said extension includes a pair of oppositely disposed guide tabs and said body has a pair of slots in said front and rear surfaces of said main body portion, said slots engaging respective said guide tabs.

7. A camera according to claim 1, wherein said extension is contoured to support at least a portion of said front and rear surfaces of said body.

8. A camera according to claim 7, wherein said body includes a film advance mechanism and said cover includes a gear rack on an interior surface, said gear rack engaging said film advance mechanism of said body when said cover is moved between said opened and closed positions.

9. A camera comprising:

a lighttight body;

a cover having opposed top and bottom surfaces and opposed from and rear surfaces, sad cover having an open end and an interior recess sized for fitting over an end of said body, said cover being subject to sliding motion relative to said body between a cantilevered open position and a closed position;

said body and said cover together having three spaced apart guide pins and three slots, each said guide pin being disposed on one of said cover and said body, each respective said slot being disposed on the other of said cover and said body, at least one of said guide pins having a shoulder with a diameter larger than a remainder of said guide pin and a respective said slot having a T-shaped contour closely fitted to said diameters of said shoulder and said remainder of said guide pin, said slots and respective said guide pins being disposed in close engagement during said sliding motion of said cover relative to said body, said sliding motion being solely controlled by said close engagement.

10. A camera according to claim 9, wherein said slots have a length defining a range between said opened position and said closed position.

11. A camera according to claim 9, wherein a pair of said guide pins are disposed on one of said front and rear sides of said body and a single guide pin depends from the opposite side.

12. The camera of claim 9 wherein said guide pins are coplanar.

13. A camera according to claim 9, wherein each said guide pin includes a shoulder portion at a depending end having a diameter greater than the remainder of said guide pin and each said slot is conformed to fit the diameter of said shoulder portion and said remainder of a respective said guide pin.

14. The camera of claim 9 wherein said cover is substantially rigid and least one of said slots has an open end.

15. The camera of claim 9 wherein at least one of said guide pins extends from each of said front and rear sides of said body.

16. The camera of claim 9 wherein said guide pins are coplanar.

17. The camera of claim 9 wherein said wherein said body includes a film advance mechanism and said cover includes a gear rack on an interior surface, said gear rack engaging said film advance mechanism of said body when said cover is subject to said sliding motion between said opened and closed positions.

18. A camera comprising:

a lighttight body having a projecting sleeve;

a cover having opposed top and bottom surfaces and opposed front and rear surfaces, said cover having an open end and an interior recess sized for fitting over an end of said body, said cover being movable relative to said body between a cantilevered open position and a closed position, said cover having an extension extending from said bottom surface, said extension including a beam-like guide arm passing through said sleeve, said guide arm and sleeve coupling said cover to said body and supporting said cover when said cover is moved to said cantilevered open position;

said body and said cover together having at least one guide pin and slot retaining said guide pin, said guide pin being disposed on one of said cover and said body, said guide pin having a shoulder with a diameter larger than a diameter of a remainder of said guide pin, said slot having a T-shaped contour closely fitted to said diameters of said shoulder and said remainder and being disposed on the other of said cover and said body.

19. The camera of claim 18 wherein said guide pin and slot are spaced apart from said sleeve.

20. The camera of claim 18 wherein said wherein said body includes a film advance mechanism and said cover includes a gear rack on an interior surface, said gear rack engaging said film advance mechanism of said body when said cover is moved between said opened and closed positions.

21. A camera according to claim 18, wherein said body has an exposure aperture approximately centrally located relative to the length of said body, wherein said sleeve and said at least one guide pin are oppositely disposed relative to the exposure aperture.

22. A camera according to claim 18, wherein said opened and closed positions define a range of movement of said cover and said guide arm has a length greater than said range of movement of said cover between said opened and closed positions and remains engaged with said sleeve when said cover is moved between said opened and closed positions.

* * * * *